US008006213B2

(12) United States Patent
Berry et al.

(10) Patent No.: US 8,006,213 B2
(45) Date of Patent: Aug. 23, 2011

(54) OPTIMIZATION METHOD OF INTEGRATED CIRCUIT DESIGN FOR REDUCTION OF GLOBAL CLOCK LOAD AND BALANCING CLOCK SKEW

(75) Inventors: Christopher J. Berry, Hudson, NY (US); Jose Luis Pontes Correla Neves, Poughkeepsie, NY (US); Charlie Chornglii Hwang, Wappingers Falls, NY (US); David Wade Lewis, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 12/032,542

(22) Filed: Feb. 15, 2008

(65) Prior Publication Data

US 2009/0210840 A1    Aug. 20, 2009

(51) Int. Cl.
*G06F 17/50* (2006.01)
(52) U.S. Cl. ......... 716/124; 716/113; 716/114; 716/120
(58) Field of Classification Search .................... None
See application file for complete search history.

(56) References Cited

U.S. PATENT DOCUMENTS

| | | | |
|---|---|---|---|
| 4,495,559 A * | 1/1985 | Gelatt et al. ............... 700/28 |
| 5,880,613 A | 3/1999 | Ishihara | |
| 5,912,820 A * | 6/1999 | Kerzman et al. ............. 716/6 |
| 5,999,716 A | 12/1999 | Toyonaga | |
| 6,205,571 B1 * | 3/2001 | Camporese et al. ........... 716/2 |
| 6,311,313 B1 * | 10/2001 | Camporese et al. ........... 716/6 |
| 6,351,840 B1 | 2/2002 | Teng | |
| 6,452,435 B1 | 9/2002 | Skergan et al. | |
| 6,609,228 B1 | 8/2003 | Bergeron et al. | |
| 6,698,006 B1 | 2/2004 | Srinivasan et al. | |
| 6,792,554 B2 | 9/2004 | Gervais et al. | |
| 7,017,132 B2 * | 3/2006 | Hou et al. ................... 716/6 |
| 7,020,861 B2 * | 3/2006 | Alpert et al. ................ 716/6 |
| 7,225,421 B2 * | 5/2007 | Migatz et al. ............... 716/13 |
| 7,461,365 B1 * | 12/2008 | Galbi et al. ................ 716/16 |
| 7,486,130 B2 * | 2/2009 | Overs et al. ................ 327/595 |
| 2005/0015738 A1 | 1/2005 | Alpert et al. | |
| 2005/0102643 A1 | 5/2005 | Hou et al. | |
| 2006/0190899 A1 * | 8/2006 | Migatz et al. ............... 716/13 |
| 2007/0136708 A1 | 6/2007 | Overs et al. | |
| 2008/0016475 A1 * | 1/2008 | Durham et al. ............... 716/2 |
| 2009/0033398 A1 * | 2/2009 | Dennis et al. ............... 327/293 |

FOREIGN PATENT DOCUMENTS

JP    5047932 B    2/1993

OTHER PUBLICATIONS

Cong et al., "Physical Planning with Retiming," 2000 IEEE, pp. 2-7.*
Cong et al., "Simultaneous Circuit Partitioning/Clustering with Retiming for Performance Optimization," Design Automation Conference 1999, pp. 460-465.*
Ellis et al., "A Hierarchical Decomposition Methodology for Multi-stage Clock Circuits," 1997 IEEE, pp. 266-273.*
Rosenfeld et al., "Design Methodology for Global Resonant H-Tree Clock Distribution Networks," IEEE Trans. on VLSI Systems, vol. 15, No. 2, Feb. 2007, pp. 135-148.*

* cited by examiner

*Primary Examiner* — Leigh Marie Garbowski
(74) *Attorney, Agent, or Firm* — William A. Kinnaman, Jr.

(57) ABSTRACT

A design methodology and algorithms for the computer aided design of integrated circuits having clock distribution networks. The clustering of latch distribution tree components is combined with repositioning of such components within clock sector areas. The movement and clustering of components is such that the timing constraints are preserved. The methods is described in terms of reducing and balancing the load inside each clock sector, although the techniques may also be applied to balancing load between clock sectors.

13 Claims, 4 Drawing Sheets

OPTIMIZATION METHOD OF INTEGRATED CIRCUIT DESIGN FOR REDUCTION OF GLOBAL CLOCK LOAD AND BALANCING CLOCK SKEW

FIELD AND BACKGROUND OF INVENTION

This invention relates to, and the following discussion assumes skill in, the design of integrated circuit chip floorplan, layout or topography.

In the design of very high performance integrated circuits, designers have to deal with multiple clock frequencies in the GHz frequency domain. Very often there is a primary frequency that drives most of the design and secondary frequencies used to drive selected parts of the design, such as for example an I/O interface. There are several design strategies to distribute these clock signals to their destinations. In one strategy the primary clock signal is distributed through a global clock distribution network to reach all the surface area of the chip, using a two-stage distribution network.

Other clock signals can be distributed in a similar fashion. However, if these signals are only used in specific areas of the design, such global distribution would be a waste of design resources. Furthermore, if these signals are sub-frequencies of the main clock signal, it is important to keep them linked to facilitate synchronization between the signals. One design technique for creating and distributing signals to drive portions of a design at different clock frequencies is to send a control signal from the clock source synchronized with the main clock. At the destination this signal is combined with the main clock signal, for example a frequency divider, to create the desired frequency. Synchronization between destinations at different locations on the chip is achieved by ensuring that the control signal reaches each destination at the same time independent of the location of the destinations. A design technique to ensure control signals are synchronized with the main clock signal is by using latches in the distribution of the control signals, the latches being controlled by the main clock signal.

The latch structures are known as Latch Distribution Trees (LDTs). In the present disclosure, new design approaches for LDTs are presented that allow design by construction of trees while reducing the load impact of such trees on the main clock distribution network. Furthermore, new approaches are introduced to distribute the load of LDTs on the main clock distribution network to help balancing clock skew. LDTs are sometimes identified as plats, and plats may be consolidated into macros drawn from a library of chip floorplan designs.

SUMMARY OF THE INVENTION

The method of this invention is distinguished by the analysis of plat load impact and movement of plats within a Sector Grid to balance clock load within the sector in order to help balance clock skew. A design methodology and algorithms are presented such that the total load on the clock distribution network is reduced by clustering plats. The clustering is combined with a movement of plats within each clock sector area to reduce clock skew. The movement and clustering of plats is such that the timing constraints of each plat are preserved. The new techniques are described hereinafter in terms of reducing and balancing the load inside each clock sector, although the techniques could also be applied to balancing load between clock sectors.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
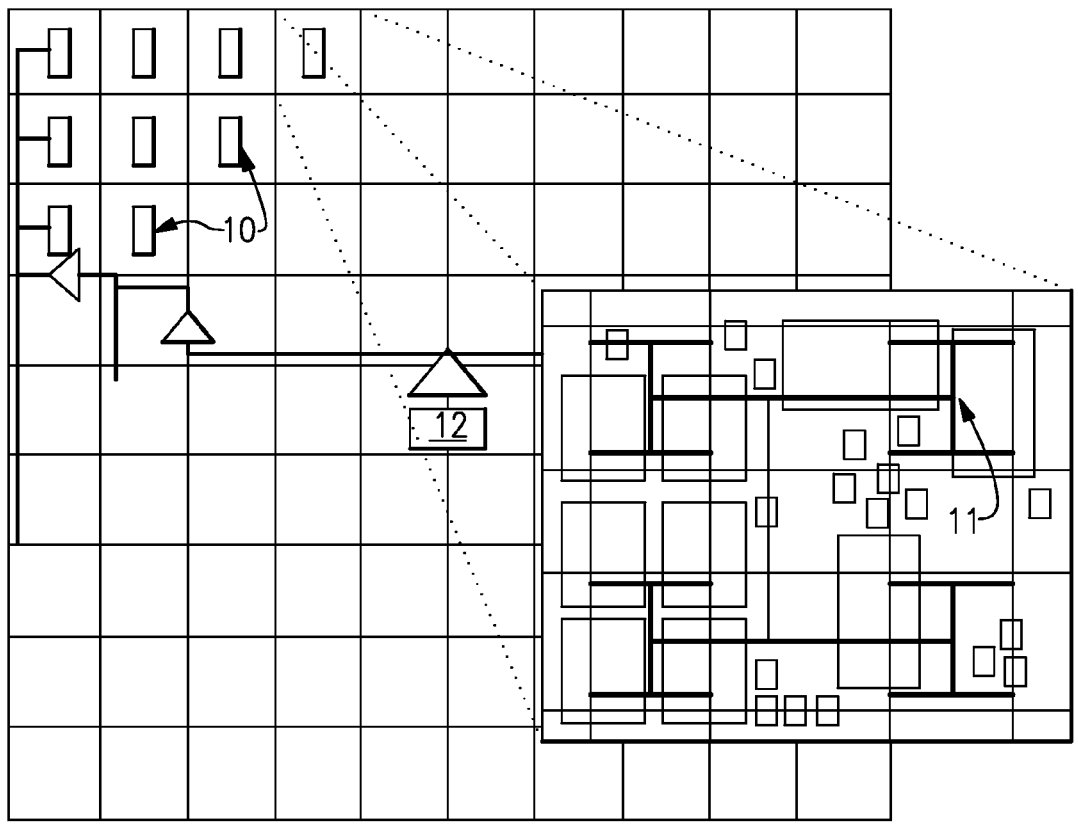
FIG. 1 is an illustration of certain chip floorplan, layout or topography characteristics of an integrated circuit or chip.

In a two-stage clock signal distribution network, the first stage distributes the signal from the source, usually at the center of the chip, to intermediate pre-defined locations called sectors. These sectors form a grid overlapping the chip surface as illustrated in FIG. 1. Each sector contains one or more buffers 10, called Sector Buffers, which drive the second stage of the clock distribution network. At this stage, each sector is sensitive to the load in the sector and different wiring structures as well as optimization techniques are used to reduce clock skew as well as other design parameters. One such wiring structure is an H-Tree 11 connecting to a global mesh or grid as shown in FIG. 1. Clock loads connect to the nearest grid wire as also exemplified in FIG. 1. These loads are primarily the clock pins of latches. However, in order to manage the complexity of such large design, multiple levels of physical hierarchy are used to encapsulate parts of the design. As such the clock pins can be the pins of latches or the pins of hierarchical structures such as macros, units, etc.

To design distribution networks for frequencies of multi GHz frequencies, several design parameters are very carefully controlled. The main design parameter is clock skew, defined as the delay difference between two clock pins, the delay being the signal latency from the phase locked loop 12 (PLL) to the clock pin. There are two types of clock skew, early mode and late mode clock skew. Early mode clock skew is particularly important because an early mode failure will cause a chip to malfunction. Late mode is also important because a higher skew between two critical clock pins will reduce chip performance. The design of a clock distribution network for very low skew (in the single pico second (ps) range) is very dependent on maximum load, or the number of devices driven by the network, and the actual location of such devices, or load distribution.

Up to the sector buffer level (first stage of the network ending at the input of each sector buffer) the design is independent of the clock load pin location. As such, the design of this network minimizes early and late clock skew by attempting to equalize delay and buffer input slew at each buffer stage in the clock distribution network starting from the PLL.

The second stage of the network (starting with a Sector Buffer) is load dependent. The load within each clock sector varies because of the location of clock pins, the number of clock pins, and the capacitance value of each clock pin. To control the clock skew within a sector and between clock sectors several design techniques are used. In one technique, the wiring structure used within a sector (H-Tree driving a grid) is designed for very low skew at the H-Tree leaves. This is accomplished with buffer and wire sizing. However, the actual skew is dependent on how balanced is the load distributed among the leaves of the H-Tree. Another design technique is to minimize the capacitance load per sector (clock pin load). Furthermore, distributing the capacitance load within the sector will help the optimization of wires and buffer(s) in the sector.

Figure 2:
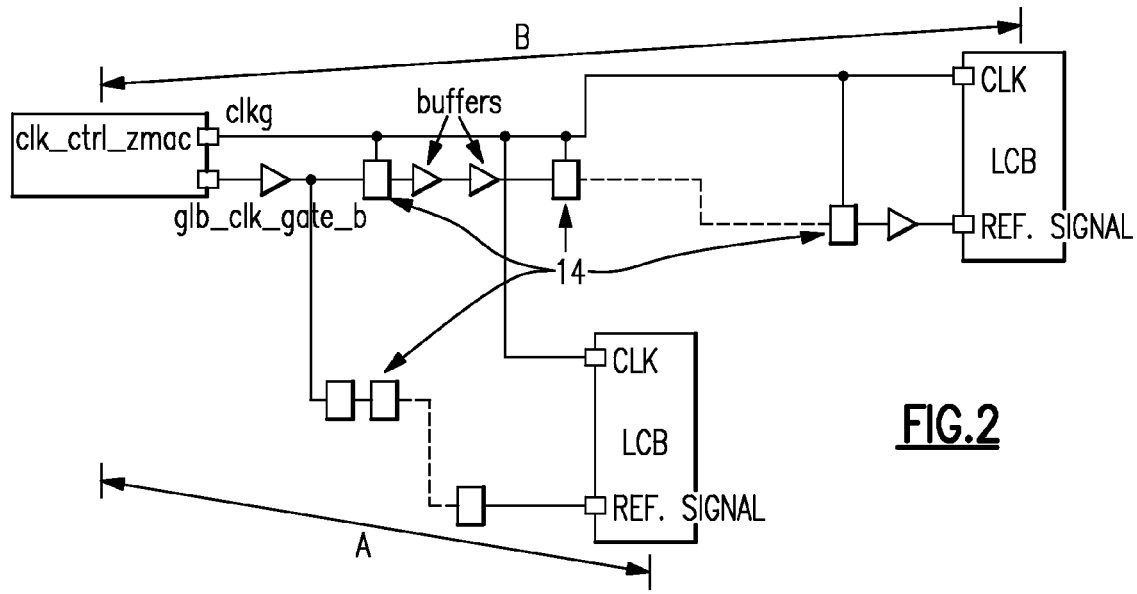
FIG. 2 is an illustration of a Latch Distribution Tree design structure.

As described above control signals are distributed to their destination using LDTs. One property of such trees is that the number of latches between source and destinations is the same, independent of the location of each destination connected to the tree. Such latches are known as plats for this disclosure. An example of a plat LDT design structure is illustrated in FIG. 2. For a high performance design the number of control signals is in the order of tens and the number of plats 14 is the order of tens of thousands. The number of plats is dependent on the number of control signals, the clock frequency (increases as the frequency increases) and how many macros are controlled by each control signal.

The location of plats 14 is determined by the placement of the macros they connect to, the source of the signal (usually common for all reference signals) and the timing requirements defined by the main clock signal. The distance between two plats is the maximum distance a signal can travel for the duration of a single clock cycle. This distance depends on the fanout of the net connecting them, the wire layers, and any buffering strategy used to stretch the distance between plats as illustrated in FIG. 2 by comparison of A and B.

For macros close to the signal source the required plats are placed close to each other while for macros further away from the source the plats are placed further apart including the use of buffer trees in between to space them out. The possibility and flexibility of placement or movement of plats creates an opportunity to reduce and/or balance the clock load within each clock sector where plats are available as described here.

Figure 3:
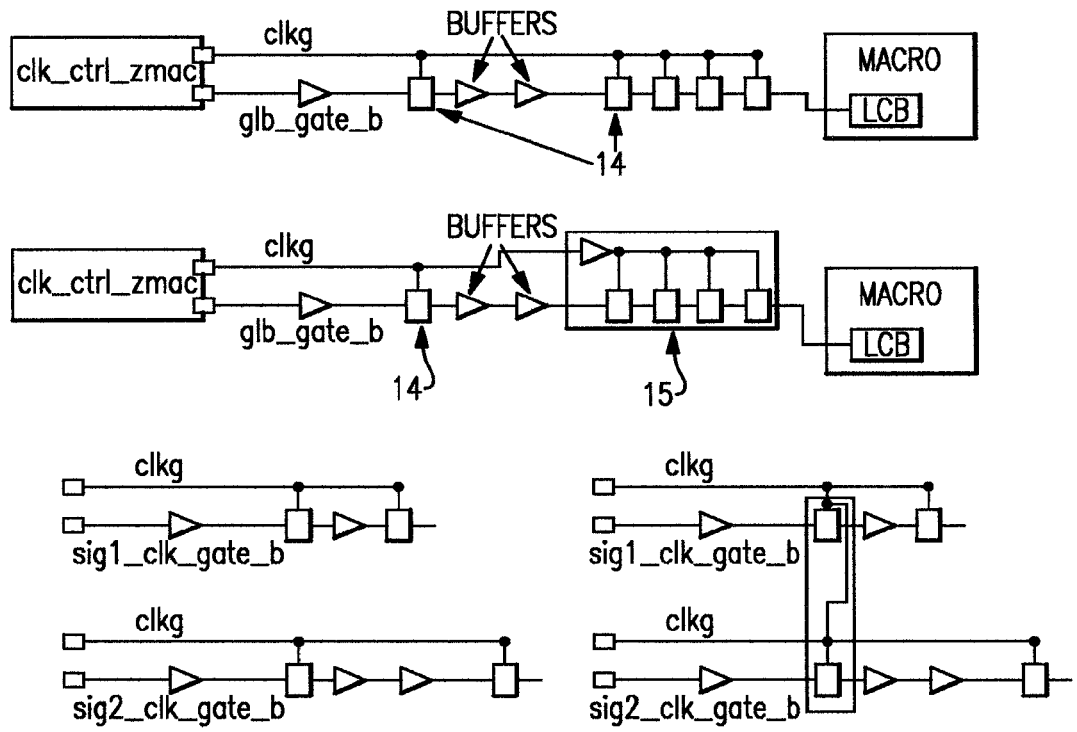
FIG. 3 is an illustration of the clustering of plats within a macro.

Plats add more loads to the clock distribution network because the clock pin of each plat is driven by the main clock distribution network. On one design example with a 4.5 GHz clock signal and more than 60 control signals, the average load increased 10% per clock sector, although some sectors may see an increase as high as 60%. One technique to reduce this load is to cluster neighboring plats into a single macro such that the clock pins of the clustered plats are driven by a buffer and only the input capacitance of the buffer is exposed to the clock grid. For example, four plats 14 can be clustered within a macro 15 reducing the load on the grid by ¼, as illustrated in FIG. 3. Plats belonging to different control signals can also be clustered within the same macro if they are physically close because the plats are still driven by the same clock reference signal.

The number of plats per sector area can vary anywhere from zero to hundreds of plats, significantly increasing the load of the sector. For the same design example a sector area had more than 200 plats which contributed with almost 1 pF load for a total load in the sector of about 4 pF. After clustering, the number of plat pins was reduced to a little over 50 pins contributing only 0.25 pF of load to the clock distribution network.

The concept of clustering plats into a macro to reduce the load on the main clock tree was used in a previous design. In such design, LDTs were analyzed for plat proximity and a designer manually selected which plats should be clustered into a signal macro. Afterwards, a timing analysis was performed on the design and any timing failures in the LDTs where manually fixed by moving plats, re-designing the buffer trees in between plats or re-clustering plats. The main goal was to meet timing. Since the insertion of LDTs was performed late in the design cycle there was a negative impact on the clock distribution network as the clock skew increased. To overcome the impact on clock skew, designers clustere latches in plat macros. The clustering was performed manually by inspection and the objective was to reduce the load while meeting timing.

In the current disclosure, the process of clustering is computational, automatic and designed to meet timing requirements. Unique to this disclosure is the analysis of plat load impact and placement of plats within a Sector Grid to balance clock load within the sector in order to help balance clock skew. A design methodology and algorithms are presented such that the total load on the clock distribution network is reduced by clustering plats. The clustering is combined with movement of plats within each clock sector area to reduce clock skew. The movement and clustering of plats is such that the timing constraints of each plat are preserved. The new techniques are described in terms of reducing and balancing the load inside each clock sector, although the techniques could also be applied to balancing load between clock sectors.

Figure 4:
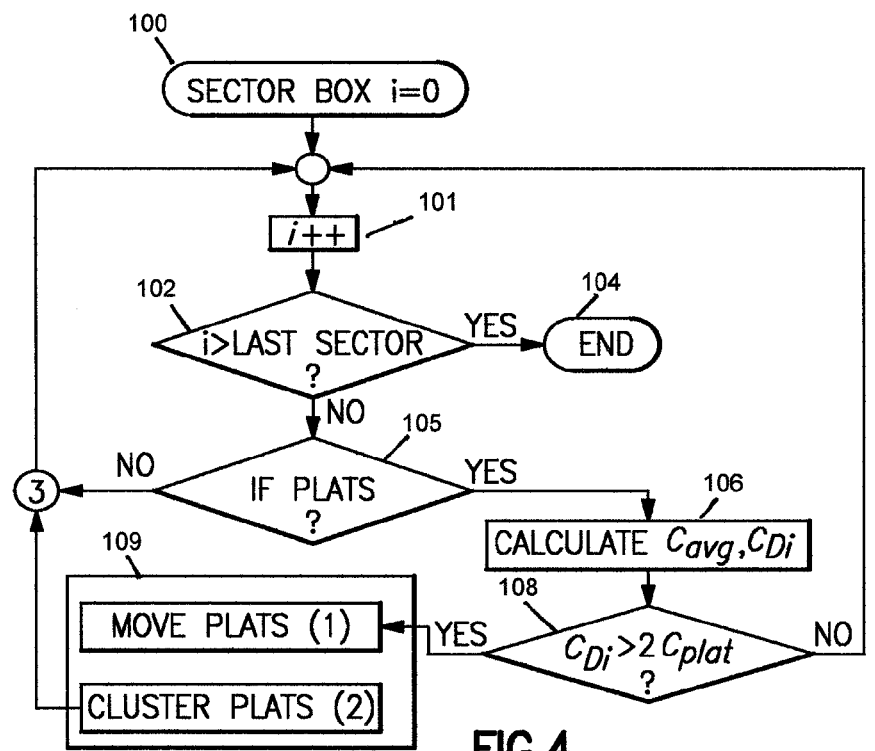
FIGS. 4 and 5 are flow charts illustrating an optimization flow applied to a chip where the clock distribution network is comprised of a grid of sector buffers.
Figure 5A:
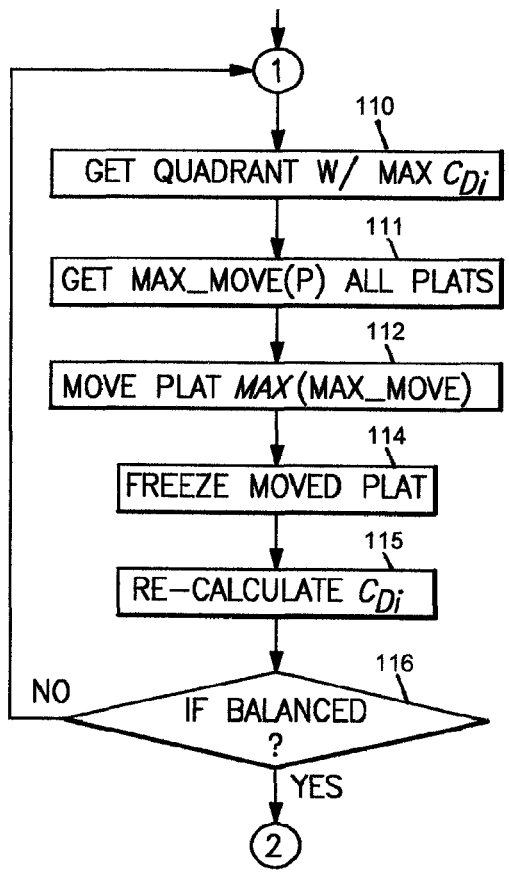

The optimization starts by analyzing each clock sector area of the chip. It is first determined if a sector satisfies the minimum requirements for plat movement and clustering that lead to load and clock skew balancing. If conditions are satisfied, the algorithms for plat movement and clustering are applied. The optimization flow applied to a chip where the clock distribution network is comprised of a grid of sector buffers (see FIG. 1) is presented in FIGS. 4 and 5a and b. The details and algorithms of each step in the process are described below.

For a given chip the procedure is applied sequentially to each sector buffer area. Before performing any movement and clustering, the procedure determines if the sector area has plats, if they can move, and if there is a load balancing/reduction due to clustering.

Figure 5B:
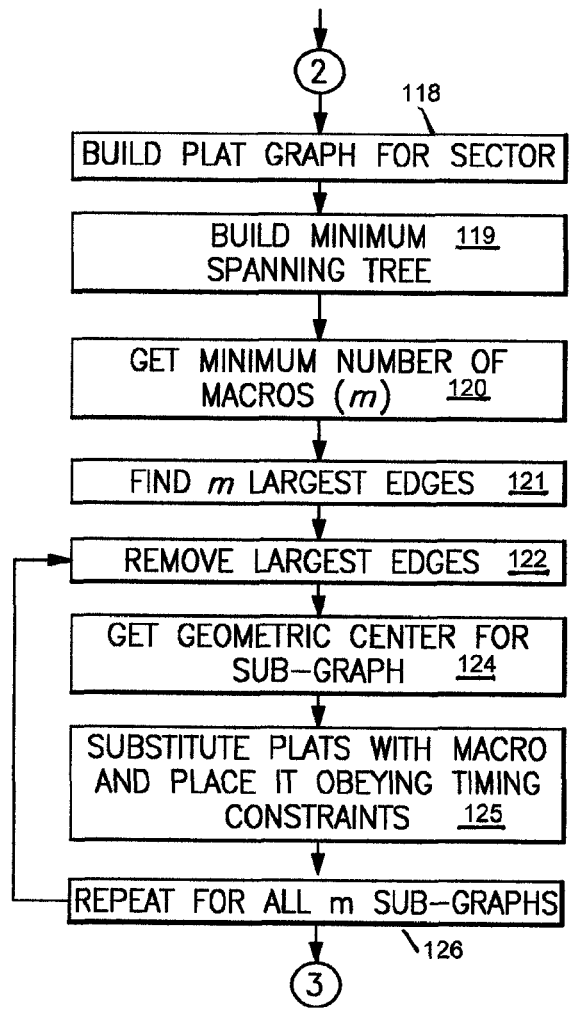

The movement algorithm is straightforward. This process starts by calculating the load deviation of each quadrant within the sector to get the quadrant with the most plat load to distribute (110 in FIG. 5a). It is then calculated how far each plat in the quadrant can move in the directions of the other three quadrants (111, 112). The process then picks-up the plat with the largest displacement value and moves it to the quadrant with lowest load and marks the plat to prevent it from being moved in a subsequent iteration (114). The algorithm then re-calculates the load deviation for each quadrant (115). If the load is still unbalanced and there are quadrants with plats to move, the process is repeated (116). After iterations have completed all possible moves among the quadrants, the clustering process starts, at the end of which clustered plats are substituted by macros (118 through 126 in FIG. 5b; 100 through 109 in FIG. 4).

Figure 6A:
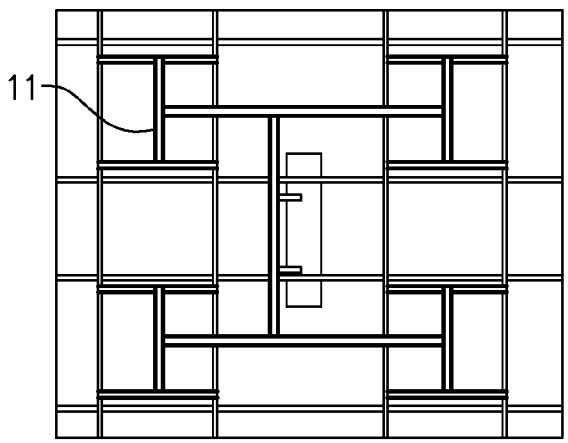
FIG. 6 is an illustration of H-Tree clock sector wiring.

As illustrated in FIG. 1 and reproduced in FIG. 6a, the wiring structure used for each clock sector is an H-Tree driven by a buffer placed around the center of the sector. The leaves of the H-Tree are directly connected to the grid (omitted in FIG. 6 for simplicity). The H-Tree is a two-level H-Tree as shown. This structure is used as the basis to describe the optimization flow, although other variations are also supported such as half sectors where the sector buffer only drives half of the tree or a sector with multiple buffers driving a full or half tree.

Figure 6B:
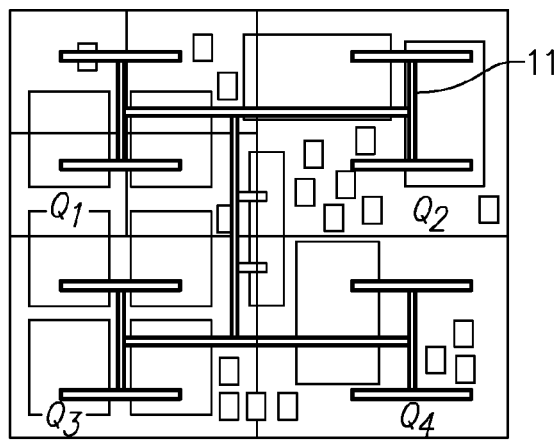

For the purposes of optimization each sector is divided in four quadrants $Q_1$, $Q_2$, $Q_3$, $Q_4$ as seen in FIG. 6b. Note that this division is such that at the center of each sub-division is a leaf node of an H-Tree level. The divisions are along the center of the main H-Tree and along the center of each H-Tree connected to each leaf of the main H-Tree. Optimization is described for a scenario in which the smallest area of movement for a plat is a quadrant. This technique can be recursively used if a quadrant is sub-divided in smaller areas. Within each quadrant there are macros or units, each contributing one or multiple clock pins to the main clock distribution network. These are illustrated in FIG. 6b. Plats are also placed structures within a sector. Each plat contributes a single clock pin of load to the clock distribution network. As one may expect, the clock pin load per sector, as well as within a sector, changes based on cell placement, macro type and plat requirements.

For the purposes of this work, the load within a sector is divided into at least two components, the load due to clock pins of plats $C_{plat}$ and the load due to clock pins of macros and/or units $C_{clk}$. The load on each quadrant is $$C_{LQi} = \Sigma C_{clk} + \Sigma C_{plat} \quad (1)$$

The average load(106 in FIG. 4) on the sector is $$C_{avg} = \Sigma C_{LQi} \div \#\text{Quads} \quad (2)$$

The deviation(108 in FIG. 4) of load from the average for each quadrant is $$C_{Di} = C_{LQi} - Cavg \quad (3)$$

The requirements to determine if plat movement and clustering will help load and clock skew balancing within a clock sector area are fourfold. First, a sector must have plats within it. Second, there must be a load imbalance between the quadrants. This is determined by the results of equation (3). If the deviation is negative, the quadrant is a potential receiver of load while if it is positive the quadrant is a potential donor of load. The minimum deviation must be greater then the input load of a plat, $C_{Di} > 2C_{plat}$. Observe that unless the load is equally balanced amongst the quadrants there is always at least one donor quadrant and one receiver quadrant. Finally, the clustering must help balance the load. For each quadrant find the minimum possible plat capacitance by applying the maximum possible cluster factor. This factor, know as Max_cluster_factor, is the largest plat macro available in the design library. The minimum plat load per quadrant is $$\text{Cplat\_min} = (\#\text{plats} \div \text{Max\_cluster\_factor}) \times Cpin \quad (4)$$

Applying (4) into (1) to (3) determines which quadrants, if any, are still donors. If, after clustering, the result of equation (3) is positive for at least one quadrant and it satisfies the minimum requirements, load balancing by plat movement can start.

The algorithm for sector plat movement and load balancing is presented below. The algorithm starts by determining if the load deviation within a sector is positive (2). That triggers the selection of quadrant and the movement of plats (3, 3.1). The step to get the quadrant with maximum load may determine that more than one quadrant has similar load. If this scenario happens the algorithm resolves the conflict by selecting the quadrant with the smallest plat count. By selecting such quadrant, the algorithm increases the possibilities of plat clustering on the quadrants to which the plats eventually move. If the plat count is the same, the algorithm just chooses the first quadrant of the selected list.

---

1. Calculate load deviation for each quadrant
2. If $C_{Di} > 0$
   2.1. Balance = ok
3. While Balance
   3.1. Get quadrant $Q_i$ with max($C_{Di}$)
   3.2. While Q is quadrant with max load && $C_{Di} > C_{plat}$
     3.2.1. For each plat $p_j$ in $Q_i$
       3.2.1.1. Calculate max_move($p_j$)
     3.2.2. Get plat with greatest positive max_move($p_j$)
     3.2.3. Move $p_j$ to quadrant with min($C_{LQi}$) covered by max_move($p_j$)
     3.2.4. Mark moved $p_j$
     3.2.5. Re-calculate $C_{Di}$ for all quadrants
   3.3. Balance = !ok
   3.4. For each quadrant $Q_i$
     3.4.1. if
       ($C_{Di} > 0$)&&($C_{LQi} - C_{plat}$) > ($C_{LQj} + C_{plat}$), $\{j = 1...4, j \neq i\}$)
       3.4.1.1. Balance = ok
     3.4.2. if Balance && all plats in $Q_i$ marked
       3.4.2.1. Balance = !ok
4. End

---

For each plat within a quadrant, the maximum distance it can move without violating the timing constraints (3.2.1) is calculated. The details of such calculation are explained herein. Plats with positive move, max_move($p_j$)>0, become candidates for movement. The algorithm picks the plat with the largest value of max_move (3.2.2) and moves the plat to the quadrant with the lowest total load without creating a timing violation (3.2.3). In other words, the distance of movement is less then the max_move($p_j$) value. The moved plat is tagged to prevent it from moving to other quadrants or returning to its original quadrant (3.2.4). After the move, the $C_{Di}$ of each quadrant is updated (3.2.5). The algorithm stays with quadrant $Q_i$ while the quadrant still has the largest load and the $C_{Di} > 0$ indicating that plats can still move out of the quadrant.

The step to calculate the maximum movement 3.2.2, may also return more than one plat with the save value of max_move($p_j$). The plat chosen to move is the one that—once moved to a donor quadrant—results in the smallest displacement for the plat. This displacement is calculated as the difference between the location of the plat and the center of a donor quadrant. The plat with the smallest value is the one chosen to move. If two plats have the same displacement value, the first one in the list is chosen.

Once all possible plats have been moved from a quadrant the algorithm evaluates if there are any more donor quadrants (3.4), otherwise the flow moves to a new sector. Several conditions are tested. First, the deviation must be greater then zero ensuring that there is load imbalance between the quadrants. Second, to prevent oscillation of plat movement between two quadrants, a donor quadrant is compared against all the other receptor quadrants. The movement should continue if the donor less a plat still has more loads then a receptor plus a plat. Lastly, a donor must still have plats that have not yet moved.

Figure 7A:
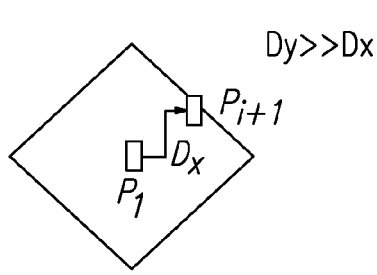
FIG. 7 is an illustration of certain characteristics of plat distribution.
Figure 7B:
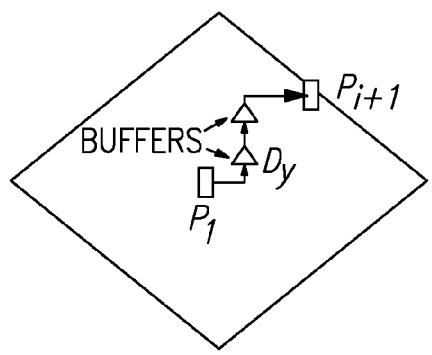

The delay between two connecting plats cannot exceed the clock cycle driving them less any setup and hold values. This delay can be translated into a Manhattan distance (orthogonal wires connecting two points) given the parasitic properties (RLC values) of the wires connecting them. The distances can be extended if trees of buffers/repeaters are used to boost the signal between the plats. The maximum Manhattan distance is obtained with a plat with a single fanout connection and it decreases as the fanout increases. The maximum allowed location of the receiver plat is at the edges of a diamond centered at the driver plat, as illustrated in FIG. 7a, which can be expanded if buffers are used as shown in FIG. 7b.

Figure 8:
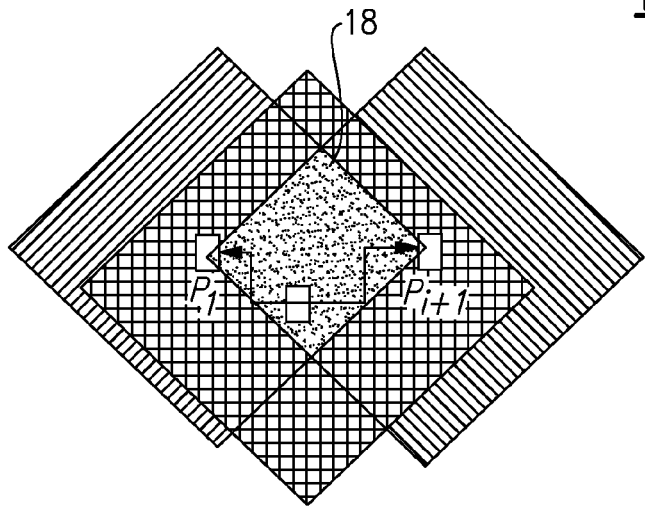
FIG. 8 is an illustration similar to FIG. 7.

To meet the timing constraints, any plat (directly or through buffer trees) must share the intersection of two or three diamonds, as shown in FIG. 8, depending if $P_i$ is connected to $P_{i+1}$ or a macro. The first diamond ($D_i$) is the one associated with the plat being moved $P_i$. Another diamond ($D_{i-1}$) is the one centered on plat $P_{i-1}$ which is the one driving plat $P_i$. The third diamond ($D_{i+1}$) is the one centered on plat $P_{i+1}$ which is the one driven by $P_i$. Observe that if Pi drives more than one plat, then there will be multiple diamonds at the level i+1 one for each plat. The intersection area 18 in FIG. 8 is the area where $P_i$ can move without violating the timing constraints between its connecting plats in a two-dimensional space.

The displacement, max_move($p_j$) is a value determined from the intersection box 18 in FIG. 8. This box is determined by the recursive intersection of diamonds using an area intersection algorithm. The outcome is a parallelogram. The max_move($p_j$) function returns the maximum distance the plat can move within the parallelogram in the direction of the quadrant to which it has been selected to move.

Once the plats have been re-distributed among the quadrants, Clustering(109 in FIG. 4) is the process of substituting a set of plats by a single macro obtained from the cell library. As illustrated in FIG. 3, a macro contains multiple internal plats (typical count in the library goes from 10 to 64 plats depending on which macro is chosen) and is designed such that all the internal plat clock pins are driven by a buffer, the input capacity of the buffer being the only load visible to the global clock distribution network.

The clustering algorithm is designed to satisfy three objectives. First, ensure that all the plats clustered in a macro still satisfy the timing requirements between plats. Second, guarantee that the chosen macro can be placed in a legal position. Lastly, minimize the number of used macros.

Clustering optimization begins by processing each clock sector grid individually, and repeating the cluster algorithm for each clock sector that contains plats to be clustered. For each latch a timing based diamond is created as shown previously. For a given latch its diamond is checked against the diamonds of all the other latches to get the common intersection area amongst all overlapping diamonds. This intersection area is the place where at least one cluster can be formed. To ensure legal placement of any cluster macro, the intersection area is overlapped against the chip placement blockage. If the intersection area is not empty then the latches can be clustered. The result of diamond overlap and overlap with placement blockage is that each latch in the clock sector gets assigned the number of overlapped diamonds.

In the next step the latch with highest overlap number is picked along with all the latches it legally overlaps. These are replaced by a latch macro which is legally placed in the intersection region. Furthermore, the netlist is updated by adding the latch macro, placing it, connecting all the correct signals to the latch macro, and deleting the intersected plats. The process is repeated for other latches in the clock sector while it is possible to cluster plats. The clustering criterion is controlled by defining which plat macros can be used for clustering. The algorithm will choose which plat macro to use to minimize the total load within the sector.

The final step is to re-run clock simulation to verify that clock skew is still within the margins defined. Likewise, because the LDT are timed at the clock frequency a timing analysis is run to ensure that all the plat paths are within the timing budgets.

Figure 9:
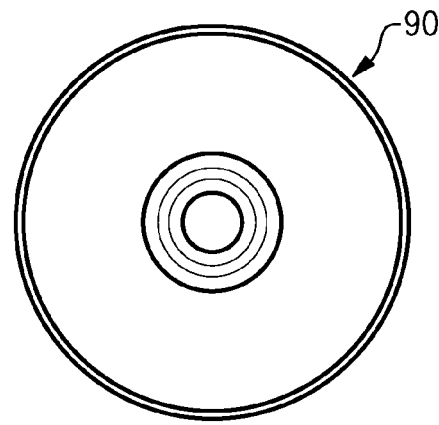
FIG. 9 shows a computer readable medium bearing code which implements this invention.

As one example, one or more aspects of the present invention can be included in an article of manufacture (e.g., one or more computer program products) having, for instance, computer usable media, indicated at 90 in FIG. 9. The media has embodied therein, for instance, computer readable program code means for providing and facilitating the capabilities of the present invention. The article of manufacture can be included as a part of a computer system or sold separately. Machine readable storage mediums may include fixed hard drives, optical discs, magnetic tapes, semiconductor memories such as read only memories (ROMs), programmable memories (PROMs of various types), flash memory, etc. The article containing this computer readable code is utilized by executing the code directly from the storage device, or by copying the code from one storage device to another storage device, or by transmitting the code on a network for remote execution.

In the drawings and specifications there has been set forth a preferred embodiment of the invention and, although specific terms are used, the description thus given uses terminology in a generic and descriptive sense only and not for purposes of limitation.

What is claimed is:

1. A method comprising:
   analyzing the clock sector areas of a layout design for an integrated circuit by executing integrated circuit design code on a computer system;
   determining by execution of the code whether a sector has latch distribution trees;
   determining by execution of the code whether repositioning of a latch component within a sector will improve clock circuit loading and clock skew balancing;
   computing by execution of the code the repositioning of a latch component which has been determined to improve clock circuit loading and clock skew balancing by such repositioning;
   effectuating by execution of the code the computed repositioning;
   computing by execution of the code a timing based diamond for each latch component;
   determining by execution of the code a common intersection area of the computed diamonds for latch components within a common clock sector; and
   determining by execution of the code whether the latch components may be clustered.

2. A method according to claim 1 wherein computing the repositioning of a latch component comprises:
   calculating by execution of the code the load deviation of quadrants within a sector determined to have latch distribution trees;
   calculating by execution of the code the distance each latch component within a quadrant within a sector can be displaced in the directions of the remaining quadrants within the same sector; and
   identifying by execution of the code the latch component having the largest displacement value and repositioning the identified latch component into the quadrant calculated to have the lowest load.

3. A method according to claim 2 further comprising marking by execution of the code a repositioned latch component to block further repositioning thereof.

4. A method according to claim 3 further comprising iterating by execution of the code the steps of calculating, identifying and repositioning until the load deviation is minimized.

5. A method according to claim 1 further comprising assigning by execution of the code to each latch component within the common clock sector a number indicative of the number of overlapping diamonds within which the respective latch components fall and identifying that latch component with the highest overlap number.

6. A method according to claim 5 further comprising, by execution of the code, replacing with a macro the latch component with the highest overlap number and those latch components having timing diamonds overlapping with the timing diamond of the latch component with the highest overlap number.

7. A method comprising:
analyzing by executing integrated circuit design code on a computer system the clock sector areas of a layout design for an integrated circuit;
determining by execution of the code whether a sector has latch distribution trees;
determining by execution of the code whether repositioning of a latch component within a sector will improve clock circuit loading and clock skew balancing;
calculating by execution of the code the load deviation of quadrants within a sector determined to have latch distribution trees;
calculating by execution of the code the distance each latch component within a quadrant within a sector can be displaced in the directions of the remaining quadrants within the same sector;
identifying by execution of the code the latch component having the largest displacement value and repositioning the identified latch component into the quadrant calculated to have the lowest load;
marking by execution of the code a repositioned latch component to block further repositioning thereof; and
after repositioning latch components, computing by execution of the code a timing based diamond for each latch component, determining the common intersection area of the computed diamonds for latch components within a common clock sector, and determining whether the latch components may be clustered.

8. A product comprising:
a non-transitory computer readable medium;
integrated circuit design program code stored on said medium accessibly to a computer system and effective, when executing on the computer system, to cause the computer system to computationally:
analyze the clock sector areas of a layout design for an integrated circuit;
determine whether a sector has latch distribution trees;
determine whether repositioning of a latch component within a sector will improve clock circuit loading and clock skew balancing;
compute the repositioning of a latch component which has been determined to improve clock circuit loading and clock skew balancing by such repositioning;
effectuate the computed repositioning;
computing a timing based diamond for each latch component;
determining a common intersection area of the computed diamonds for latch components within a common clock sector; and
determining whether the latch components may be clustered.

9. A product according to claim 8 wherein the program code, when executing and computing the repositioning of a latch component:
calculates the load deviation of quadrants within a sector determined to have latch distribution trees;
calculates the distance each latch component within a quadrant within a sector can be displaced in the directions of the remaining quadrants within the same sector; and
identifies the latch component having the largest displacement value and repositions the identified latch component into the quadrant calculated to have the lowest load.

10. A product according to claim 9 wherein the program code, when executing, marks a repositioned latch component to block further repositioning thereof.

11. A product according to claim 10 wherein the program code, when executing, iterates the steps of calculating, identifying and repositioning until the load deviation is minimized.

12. A product according to claim 8 wherein the program code when executing assigns to each latch component within the common clock sector a number indicative of the number of overlapping diamonds within which the respective latch components fall and identifies that latch component with the highest overlap number.

13. A product according to claim 12 wherein the program code when executing replaces with a macro the latch component with the highest overlap number and those latch components having timing diamonds overlapping with the timing diamond of the latch component with the highest overlap number.

* * * * *